April 20, 1965 F. LOUZIL 3,179,417

ATTACHMENT FOR MAGNETIC RECORDER TAPE

Filed June 6, 1962

INVENTOR
FRIEDRICH LOUZIL
BY Frank R. Jufani
AGENT

United States Patent Office 3,179,417

Patented Apr. 20, 1965

3,179,417

ATTACHMENT FOR MAGNETIC RECORDER TAPE

Friedrich Louzil, Vienna, Austria, assignor to North American Philips Company, Inc., New York, N.Y., a corporation of Delaware Filed June 6, 1962, Ser. No. 200,389

Claims priority, application Austria, June 16, 1961, A 4,705/61

7 Claims. (Cl. 274—1)

This invention relates to tags for magnetic recorder tape in the form of a wedge-shaped body having a knife edge parallel to the surface of the tape.

Tags are provided at the ends of a magnetic record carrier especially in cases where the take up and/or supply spools are provided having inclined recesses extending from the edges of the flanges into the core of the spool. A tag of a width larger than the width of the tape and larger than the internal distance between the flanges of the spool, after introduction into a recess, is drawn by the edges of the recesses upon rotation of the spool, and guided to the core of the spool and held in position there. If the tag is to be introduced into the spool recess by means of a device by which it is gripped and brought into the recess of the winding spool, a tag in the form of a wedge-shaped body having a knife edge parallel to the surface of the tape has been found advantageous.

In such wedge-shaped tags it is known to fasten the end of the tape to one surface of the wedge in the simplest way, for example by gluing. The mechanical rigidity of such gluing is fully satisfactory per se, especially if this operation is carried out as in a factory. However, the fact that a certain length of the tape at each end thereof is permanently connected to a tag is often a drawback. On the other hand a tag which may be secured readily, rapidly and safely by everyone according to requirements without further expedients or tools being required affords considerable advantages.

According to the invention, in a tag for magnetic recorder tape in the form of a wedge-shaped body having a knife edge parallel to the surface of the tape, is provided with a recess extending from one surface of the wedge via the knife edge into the other surface of the wedge. Said recess having a width equal to that of the tape and serving to receive an acutely bent spring plate adapted to be slipped onto the wedge, thus permitting one end of the tape laid within the recess round the knife edge of the body to be clamped in position. The wedge body of the tag is preferably provided with a transverse groove for receiving the end of one limb of the spring which may be bent inwardly, if desired.

The wedge body of the tag is preferably provided, in alignment with one wedge surface, with a tongue-like extension extending in the direction of the tape and provision being made of a sleeve of flexible material, for example synthetic material, which is open at each end and adapted to be slip fitted on the extension. The sleeve located in alignment with the wedge surface is provided with a tongue extending beyond the knife edge of the wedge, and having a width equal to that of the tape, thus enabling a tape pulled through the sleeve to be clamped in position on the tag by means of the spring plate and the end of the tongue.

This embodiment affords the advantage that the spring on being slipped onto the wedge body engages on the tongue instead of on the sensitive tape and thus cannot damage the tape. It is thus insured that the connection between the tape and the tag is secure.

In order that the invention may be readily carried into effect, an embodiment thereof will now be described in detail, by way of example, with reference to the accompanying diagrammatic drawing, in which.

Figures 1, 2, 3, 4, 5:
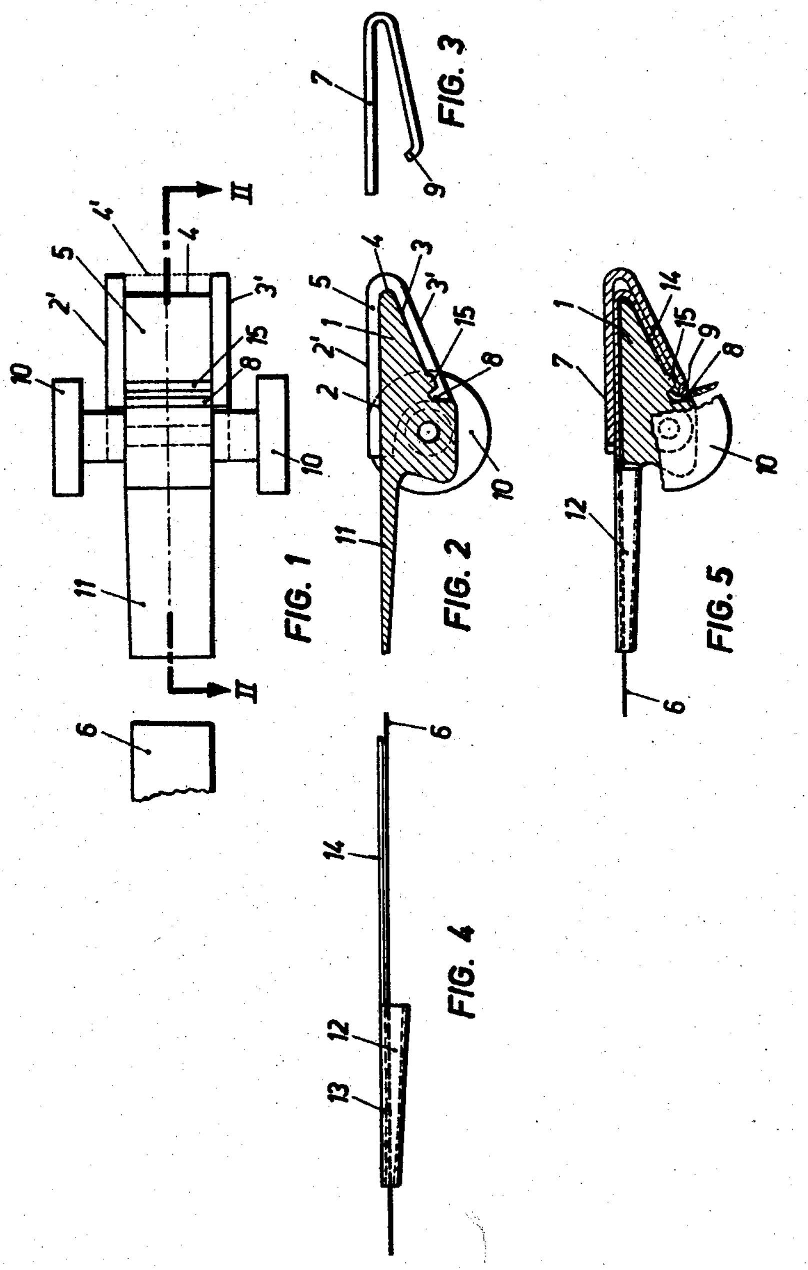
FIGURE 1 is a plan view on the body of a tag according to the invention.
FIGURE 2 is a cross-sectional view, taken along the line II—II of FIGURE 1.
FIGURE 3 shows a spring plate intended for the body of FIGURE 1.
FIGURE 4 shows a sleeve with a tape pulled through it, which may be fitted onto the same body.
FIGURE 5 is a partly sectional view of the tag (including sleeve and spring plate) mounted on the tape.

The wedge-shaped body 1 of the tag with surfaces 2' and 3' and a knife edge 4' has a recess 5 which extends from one wedge surface 2 via the knife edge 4 into the other wedge surface 3. The recess 5 has a width equal to that of a tape 6. An acutely-bent spring plate 7 is accommodated by recess 5 so that a tape end laid in the longitudinal direction in recess 5 prior to slipping on spring 7 may be clamped fast on the wedge body 1. The thickness of spring plate 7 and the depth of recess 5 are preferably matched to one another, taking into account the thickness of the tape, so that the spring plate 7 after being slipped onto the body 1 fills the recess 5 so as to be substantially flat. To safeguard the spring 7 from sliding off, the wedge body 1 is provided with a transverse groove 8 and the end of one limb of spring plate 7 has a bent part 9 which snaps into transverse groove 8.

Several embodiments are possible to bring the wedge to the width required to be taken along by inclined edges of recesses in spool flanges. In the embodiment shown two rollers 10 rotatable about a common shaft are provided on the wedge body 1. However any suitable means defining a pair of lateral projections similar to said rollers 10 may be utilized.

The device so far described suffices in itself for a safe, simple and ready attachment of the tape end to the wedge body. However, when using tapes which are very thin and hence sensitive, the risk is involved that the tape may be damaged in an uncontrollable manner upon slipping the spring 7 onto the wedge body 1, thus attenuating the connection between the tape and the tag. To obviate this possibility completely, the wedge body 1 is provided with a tongue-like extension 11 in alignment with wedge surface 2 and extending in the direction of tape 6. A sleeve 12 of flexible material, for example synthetic material, which is open at each end, fits on the extension 11. A wall 13 of sleeve 12, located in alignment with wedge surface 2, is extended to form a tongue or flap 14 having a length such that, after sleeve 12 has been slipped onto the extension 11, it projects from the knife edge which has remained within recess 5. The widths of the extension 11 and of the tongue 14, together with the internal width of sleeve 12, are again equal to the width of the tape.

In mounting the tag the tape is pulled through the sleeve so far (FIGURE 4) that the tape end projects a certain length from the end of tongue 14. Subsequently the sleeve, together with the tape, is slipped onto the extension 11. During the subsequent slipping of spring 7 on the wedge it no longer slides on the sensitive tape, but on tongue 14, clamping the tape together with the end of the tongue on the wedge body 1. To make allowance for the thickness of the tongue, a narrow rib 15 may be provided in recess 5 in front of transverse groove 8. It is at this area only that the spring 7 directly contacts the tape 6.

What is claimed is:

1. An article of manufacture comprising a wedge shaped body having a knife edge intermediate first and second wedge surfaces, a recess coextensive with at least one of said surfaces and extending across said edge into the other of said surfaces, a generally matching wedge shaped spring plate having a width substantially equal to the width of said recess overlying said edge and receivable in said recess for securing said body to the end of a tape within said recess on each said surface and said edge, and means defining a lateral projection at each side of said body portion.

2. An article of manufacture comprising a wedge shaped body having a knife edge intermediate first and second wedge surfaces, a recess coextensive with at least one of said surfaces and extending across said edge into the other of said surfaces, a transverse groove adjacent said recess in the said other of said surfaces, a generally matching wedge shaped spring plate having a width substantially equal to the width of said recess overlying said edge and receivable in said recess, said spring plate having a bent edge receivable in said groove, and means defining a lateral projection at each side of said body portion.

3. An article of manufacture comprising a tag to be removably fastened to the end of a magnetic tape, said tag comprising a wedge shaped body portion having a knife edge intermediate converging first and second wedge surfaces and a tongue portion adjacent and offset with respect to one of said surfaces extending from said body portion in the direction opposite and away from said knife edge, a recess in said body portion coextensive with said one surface and the plane of said tongue portion, said recess extending over said knife edge and into the other of said surfaces and terminating at a transverse rib, a transverse groove at the side of said rib opposite said recess, and means defining a lateral projection at each side of said body portion.

4. An article of manufacture in combination with the tag according to claim 3 comprising a wedge shaped spring plate substantially matching said wedge shaped body portion and having a width substantially equal to the width of said recess and receivable within said recess for securing said tag to the end of a tape placed loosely within said recess on each said surface and over said edge, and said spring plate having a bent edge receivable in said groove.

5. The combination comprising a tag to be fastened to the end of a tape by a spring clip means and said tag having a tongue projecting therefrom; means defining a sleeve open at each end and an elongated tongue portion extending therefrom, said means having the end of said tape extending through said sleeve and substantially coextensive with said tongue portion, said sleeve being slipped over the tongue projecting from said tag and the tongue portion of said means being secured on said tag by said spring clip between said spring clip and said tape for protecting said tape against damage by assembly of said spring clip and tag.

6. The combination with a magnetic tape comprising a tag having a wedge shaped body portion having a knife edge intermediate converging first and second wedge surfaces and a tongue portion adjacent and offset with respect to one of said surfaces extending from said body portion in the direction opposite and away from said knife edge, a recess in said body portion coextensive with said one surface and the plane of said tongue portion, said recess extending over said knife edge and into the other of said surfaces and terminating at a transverse rib, a transverse groove at the side of said rib opposite said recess, and means defining a lateral projection at each side of said body portion; a wedge shaped spring plate substantially matching said wedge shaped body portion and having a width substantially equal to the width of said recess and receivable in said recess for securing said tag to the end of said tape placed loosely within said recess on each said surface and over said edge, and said spring plate having a bent edge receivable in said groove; and means intermediate said spring clip and said tape on said tag, said means including a sleeve open at each end and an elongated flap portion, said tape passing through said sleeve and said sleeve being slipped over the tongue portion of said tag for placing said elongated flap between said tape and said spring clip within the recess of said tag.

7. The combination according to claim 6 wherein said means defining a lateral projection at each side of said body portion comprises a roller rotatably secured on said body portion at each side thereof.

References Cited by the Examiner

UNITED STATES PATENTS 2,652,918 9/53 Lippert ---------------- 242—74

NORTON ANSHER, *Primary Examiner.*

EMIL G. ANDERSON, *Examiner.*